Figure 1:
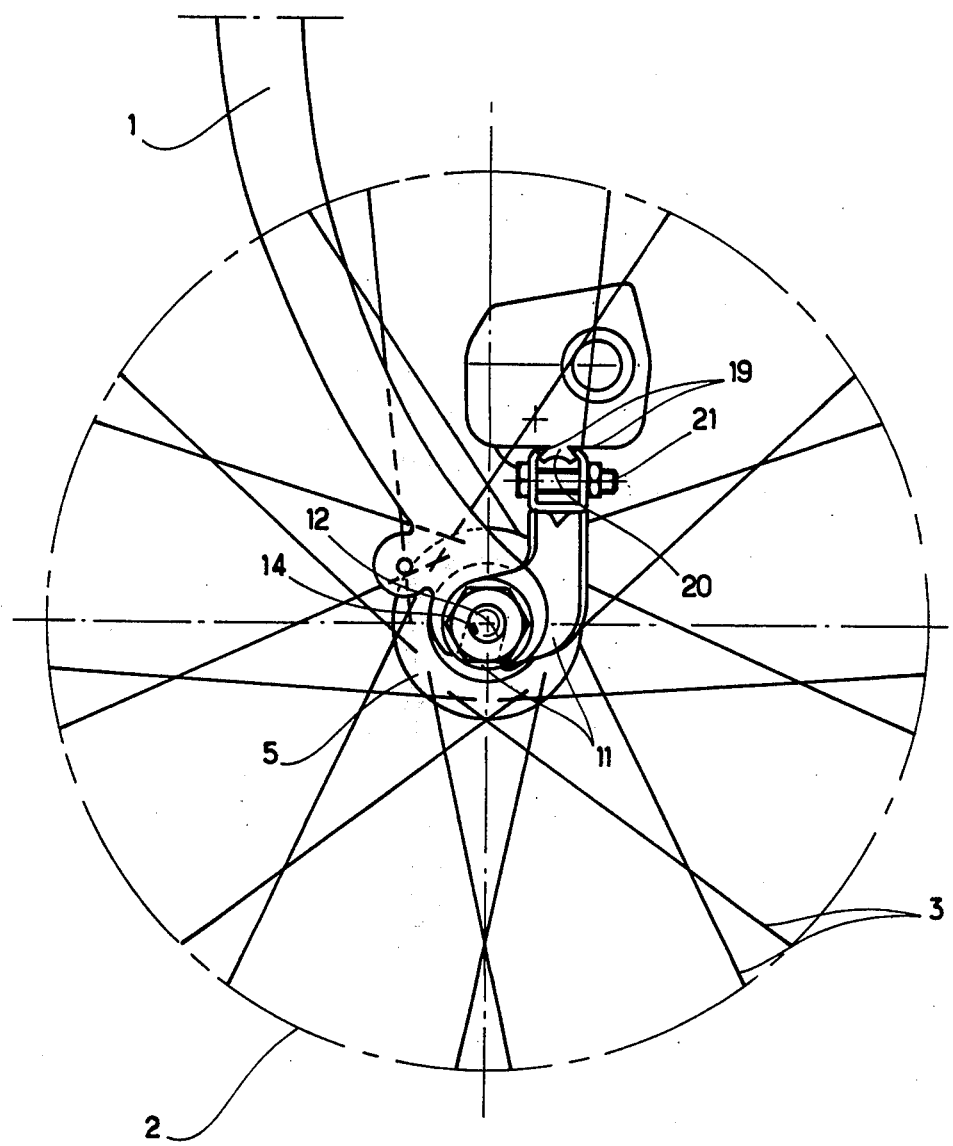

United States Patent [19]

Huret

[11] 4,179,935

[45] Dec. 25, 1979

[54] SPEEDOMETER FOR MOUNTING ON A CYCLE

[75] Inventor: Roger H. M. Huret, Nanterre, France

[73] Assignee: Etablissements Huret & Ses Fils, Nanterre, France

[21] Appl. No.: 935,593

[22] Filed: Aug. 21, 1978

[30] Foreign Application Priority Data

May 23, 1978 [FR] France ............... 78 15335

[51] Int. Cl.² .................................. G01P 1/02
[52] U.S. Cl. .................................. 73/493; 73/527
[58] Field of Search ............... 180/289, 34; 235/95 R, 235/95 B, 96; 73/488, 489, 490, 493, 527, 529, 548; 116/56, 57, 37, 62.1, 62.4; 280/289 R, 289 D, 227; 301/95, 105 B; 308/192

[56] References Cited

U.S. PATENT DOCUMENTS

| 508,941 | 11/1893 | Hilliard | 235/95 R |
|---|---|---|---|
| 537,896 | 4/1895 | Loew | 235/95 R |
| 567,260 | 9/1896 | Boon | 73/493 |
| 588,726 | 8/1897 | Burdick | 235/95 R |
| 597,272 | 1/1898 | Edwards | 235/95 R |
| 627,589 | 6/1899 | Moon | 73/527 X |
| 670,432 | 3/1901 | Powers | 73/527 X |
| 745,726 | 12/1903 | Hathaway | 73/529 X |
| 2,788,763 | 4/1957 | Ries | 116/56 |

*Primary Examiner*—Donald Watkins
*Attorney, Agent, or Firm*—Wolf, Greenfield & Sacks

[57] ABSTRACT

(a) Cycle provided with a speedometer.
(b) Cycle characterized in that it comprises a clamp provided with an opening for its fixing on the axle of the wheel hub.

8 Claims, 2 Drawing Figures

Fig: 1

SPEEDOMETER FOR MOUNTING ON A CYCLE

The invention relates to a cycle provided with a speedometer.

Cycles provided with speedometers indicating an instantaneous travelling speed and/or a total number of kilometers travelled are known.

Certain of these speedometers are driven from a pulley which is fixed to one of the disks or blocks of the hub of the cycle wheel and which drives via an endless belt the pulley of the speedometer, which is itself fixed to one of the arms of the fork constituting the support of the axle of said wheel.

However, such devices have disadvantages, mainly due to the fact that prior to the assembly of the wheel or after its reassembly, it is necessary to remove or install the endless belt for driving the speedometer.

This operation is far from easy, in view of the fact that the belt is taut between said two pulleys and is virtually inextensible making it necessary to loosen the clamp for fixing the speedometer to the frame, followed by the repositioning of said speedometer in order to place the belt under tension, the two driving pulleys being located in the same plane.

Furthermore, during these wheel assembly and disassembly operations, the belt can become lost or damaged.

The object of the present invention is to obviate these disadvantages and to this end relates to a cycle provided with a counter which comprises a clamp having an opening for its fixing of the shaft of the wheel hub.

According to another feature of the invention, the opening in the clamp is provided with an internal pin which can be located in a longitudinal groove formed on the axle of the wheel hub.

The invention is illustrated in exemplified and non-limitative manner in the attached drawings, wherein show:

FIG. 1 a partial side view of the fork of the front wheel of a cycle provided with a speedometer.

Figure 2:
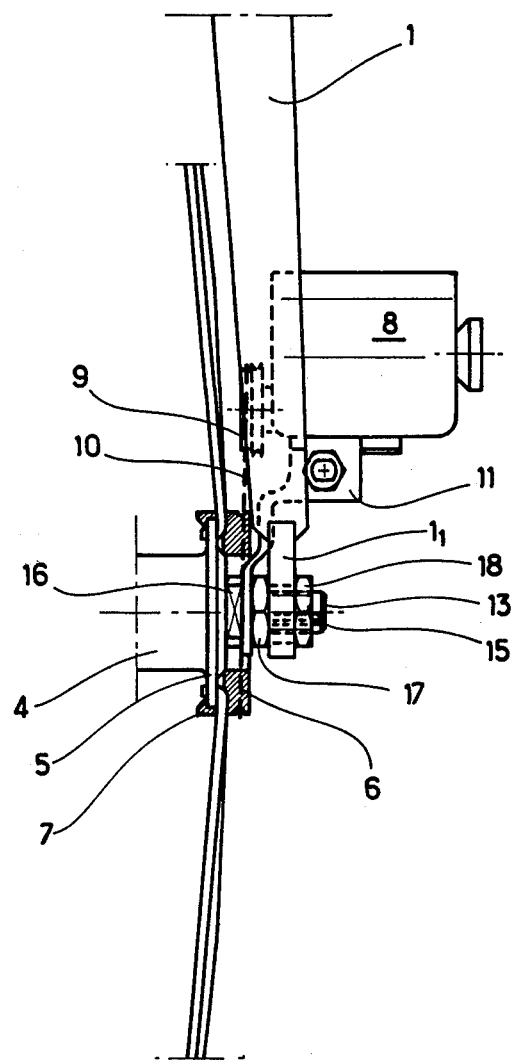

FIG. 2 a view from the left of FIG. 1 which also shows in section the driving pulley fixed on the hub.

The object of the present invention is to provide a device which ensures the positioning of the speedometer and more particularly its driving pulley at a constant distance from the wheel hub axle, i.e. the driving pulley fixed to the hub of said wheel, no matter whether the wheel is fixed to the arms of the fork of the cycle or not.

Thus, this arrangement makes it possible to assemble and disassemble the wheel without losing the initial setting and then resetting the position of the speedometer, whereby during these operations the driving belt which passes over the two pulleys of the hub and the speedometer remain constantly in place and under tension.

The drawings show branch 1 of a front fork of a cycle on which is mounted in rotary manner the front wheel 2, provided with spokes 3 and a hub 4, whereof one of the blocks 5 is externally provided with a pulley 6 fixed to said block by random means and for example by means of hooks 7. Speedometer 8, which is provided with driving pulleys 9, is driven by means of an endless belt 10 from pulley 6.

According to the invention, speedometer 8 is mounted on a clamp 11, provided with an opening 12, corresponding to the diameter of axle 13 of hub 4 of the wheel.

This opening 12 also has an internal pin 14 which can be located in a correspondingly shaped groove 15 provided longitudinally on axle 13.

Clamp 11, fitted on axle 13, whilst it is locked longitudinally between on the one hand cone 16 serving to regulate the ball bearing of the hub and on the other nut 17.

Nut 17 serves as a support for clamp $1_1$ of branch 1 of the fork which is fixed to axle 13 by a nut 18.

In this arrangement, clamp 11 of the support is disposed on axle 13 between block 5 of hub 4 and clamp $1_1$ of branch 1 of the fork.

Block 11 is also provided with a slide for the mounting of speedometer 8, said slide being constituted by the parallel edges 19 located in lateral grooves formed on a rib 20 of the speedometer.

The parallel edges 19 are parallel to axle 13 of the wheel, in such a way that one of the pulleys 9 can be positioned in the plane of the groove of pulley 6.

Once the setting has been made, speedometer 8 is locked in position by means of a screw and a nut 21 which serve to tighten the edges 19 in the grooves of rib 20.

I claim:

1. In combination a bicycle speedometer, a bicycle wheel for mounting on the fork of a bicycle and said bicycle wheel having an axle, axle securing means for securing said axle to said fork and means for operatively securing said speedometer to said axle for activation of said speedometer on rotation of said wheel, said means for operatively securing being independent of said axle securing means whereby said speedometer remains in operative relation to said wheel when said axle is disengaged from said fork.

2. The combination as recited in claim 1 wherein said means for operatively securing said speedometer to said axle comprises a clamp having a first end and a second end, said first end having an opening corresponding to the diameter of said axle so that said first end is positioned onto said axle between a ball bearing unit and a nut, said opening at said first end having a longitudinal pin positioned to fit within a parallel and confronting groove on said axle, said second end having a slide means whose longitudinal axis is parallel to said wheel axis, said first and second ends mount said speedometer in operative relation to said wheel when said axle is engaged or disengaged from said fork.

3. The combination as recited in claim 2 wherein said slide means comprises a pair of parallel edges supported by confronting surfaces, said edges caused to confront and enclose each lateral groove on a rib of said speedometer so that said speedometer is slidably aligned into said operative relation to said wheel axle.

4. The combination as recited in claim 1 wherein said axle securing means comprises a nut secured on said axle at an outermost side of said fork.

5. An improved speedometer for a bicycle of the type having a drive pulley unit, a hub pulley mounted on the block portion of a bicycle hub, a pulley belt in contact with said drive pulley unit and hub pulley, and a support bracket in contact with said drive pulley unit and the axle of said hub wherein the improvement comprises means for mounting said speedometer on said axle of said bicycle so that said drive pulley is at a constant distance from said hub axle when said hub axle is mounted or dismounted from said bicycle.

6. An improved speedometer for a bicycle as set forth in claim 5 wherein said means for mounting comprises a clamp having an opening at a first end corresponding to the diameter of said axle and a slide means at a second end to support said drive pulley unit, said slide means having its longitudinal axis parallel to said wheel axle, said opening at said first end of said clamp having a longitudinal pin positioned to fit within a parallel and confronting groove on said wheel axle so that said first end is positioned between said hub pulley and a bicycle fork bracket whereby said distance between said drive pulley and said hub pulley remains constant whether said hub axle is engaged or disengaged from said fork bracket.

7. An improved speedometer for a bicycle as set forth in claim 6 wherein said slide means comprises a pair of parallel edges supported by confronting surfaces, said edges caused to confront and enclose each lateral groove on a rib of said drive pulley unit so that a pulley of said drive pulley unit is slidably aligned into the plane of said hub pulley.

8. An improved speedometer for a bicycle as set forth in claim 7 wherein said slide means further comprises a screw locking means connected between said confronting surfaces supporting said parallel edges so that said parallel edges are caused to securely press against said ribs of said drive pulley unit in a locking relationship.

* * * * *